United States Patent
Lee et al.

(10) Patent No.: US 11,465,591 B2
(45) Date of Patent: Oct. 11, 2022

(54) HYBRID WINDSHIELD WIPER BLADE

(71) Applicant: ALBEREE PRODUCTS, INC., Halethorpe, MD (US)

(72) Inventors: Albert Lee, Baltimore, MD (US); Franz Johannes Buechele, Maryville, TN (US)

(73) Assignee: ALBEREE PRODUCTS, INC., Halethorpe, MD (US)

( * ) Notice: Subject to any disclaimer, the term of this patent is extended or adjusted under 35 U.S.C. 154(b) by 565 days.

(21) Appl. No.: 16/294,249

(22) Filed: Mar. 6, 2019

(65) Prior Publication Data
US 2019/0275989 A1    Sep. 12, 2019

Related U.S. Application Data

(60) Provisional application No. 62/640,422, filed on Mar. 8, 2018.

(51) Int. Cl.
*B60S 1/38*    (2006.01)

(52) U.S. Cl.
CPC .............. *B60S 1/3801* (2013.01); *B60S 1/38* (2013.01); *B60S 1/3887* (2013.01); *B60S 2001/3813* (2013.01); *B60S 2001/3815* (2013.01)

(58) Field of Classification Search
CPC .. B60S 1/38; B60S 1/3801; B60S 2001/3813; B60S 2001/3815; B60S 2001/3812; B60S 1/3887
USPC .............................. 15/250.44, 250.46, 250.47
See application file for complete search history.

(56) References Cited

U.S. PATENT DOCUMENTS

| | | | | |
|---|---|---|---|---|
| 2,616,113 A * | 11/1952 | Scinta | .......... | B60S 1/38 15/250.47 |
| 3,386,126 A * | 6/1968 | Hadekel | ............ | B60S 1/3801 15/250.47 |
| 3,879,793 A * | 4/1975 | Schlegel | ............ | B60S 1/3806 15/250.201 |
| 4,095,308 A * | 6/1978 | Blaiklock | ........... | B60S 1/3801 15/250.19 |
| 4,127,912 A * | 12/1978 | Deibel | ........... | B60S 1/40 15/250.47 |
| 4,953,251 A * | 9/1990 | Chow | .............. | B60S 1/3801 15/250.46 |
| 6,415,473 B1 * | 7/2002 | Rapp | ............. | B60S 1/32 15/250.351 |
| 8,935,825 B2 * | 1/2015 | Song | ............. | B60S 1/3806 15/250.44 |

(Continued)

FOREIGN PATENT DOCUMENTS

| | | | |
|---|---|---|---|
| CN | 107627997 | * | 1/2018 |
| DE | 2537474 | * | 3/1977 |

(Continued)

OTHER PUBLICATIONS

Canadian Office Action for Application No. 3,092,872 dated Oct. 6, 2021.

*Primary Examiner* — Gary K. Graham
(74) *Attorney, Agent, or Firm* — Birch, Stewart, Kolasch & Birch, LLP (57) ABSTRACT

A wiper blade including multiple frame components hingedly connected to one another and at least two joint springs applying elastic force to respective frame components, the wiper blade accommodating a changing curvature of a surface of a windshield.

20 Claims, 11 Drawing Sheets

(56) References Cited

U.S. PATENT DOCUMENTS

| | | |
|---|---|---|
| 2013/0340197 A1 | 12/2013 | Song |
| 2014/0068887 A1 | 3/2014 | Lee |
| 2014/0109336 A1 | 4/2014 | Song |
| 2016/0185320 A1* | 6/2016 | An ............... B60S 1/3801 15/250.351 |
| 2017/0080901 A1 | 3/2017 | Houssat et al. |
| 2019/0092284 A1* | 3/2019 | Shen ............... B60S 1/40 |

FOREIGN PATENT DOCUMENTS

| | | |
|---|---|---|
| EP | 3147165 A1 | 3/2017 |
| KR | 10-1609230 B1 | 4/2016 |

* cited by examiner

HYBRID WINDSHIELD WIPER BLADE

CROSS-REFERENCE TO RELATED APPLICATIONS

This application claims priority under 35 U.S.C. § 119(e) to U.S. Provisional Application No. 62/640,422, filed Mar. 8, 2018, the disclosure of which is incorporated herein by reference.

BACKGROUND OF THE INVENTION

Field of the Invention

Embodiments of the invention are directed generally to windshield wiper blades usable with various wiper arms. More particularly, the embodiments of the invention are directed to wiper blades having segmented portions.

Description of the Related Art

Various types of wiper blades are available which utilize respective adapters for connection of wiper blades to various wiper arms of automobiles. Thus, a particular arm may be connectable to wiper blades using the adapters.

SUMMARY OF THE INVENTION

An embodiment of the invention is directed to a wiper blade having multiple components, the wiper blade being used for removing water and other deposits from an automotive windshield.

According to an embodiment of the invention, a wiper blade includes a plurality of segmented portions, including a primary member with an interior space formed in the primary member, and two secondary members. Each secondary member has a first end and a second end, the first end of a first secondary member being connected to and received into the interior space of the primary member at a first end of the primary member, the first end of a second secondary member being connected to and received into the interior space of the primary member at a second end of the primary member opposite to the first end of the primary member. The secondary parts may be hingedly connected to the primary member to pivot, swivel and/or rotate relative to a longitudinal axis of the primary member to accommodate a changing curvature of a surface of a windshield based on pressure applied by the wiper arm against the windshield.

The wiper blade may further include two tertiary members, each tertiary member being connected to a secondary member at a first end thereof and may be hingedly connected to the respective secondary member to pivot, swivel and/or rotate relative to a longitudinal axis of the secondary member to accommodate a changing curvature of a surface of a windshield based on pressure by the wiper arm applied against the windshield.

The wiper blade further includes a first joint spring fixed to the interior of the primary member and fixed to an interior of the first secondary member. The first joint spring extends across the first secondary member and extends across the primary member and fixes the first secondary member and the primary member to one another. A second joint spring is fixed to the interior of the primary member and is fixed to an interior of the second secondary member. The second joint spring extends across the second secondary member and across the primary member and fixes the second secondary member and the primary member to one another.

The first and second joint springs are provided to the interior of the primary member and the respective secondary members and are kept in place by a plurality of wedge-shaped overhangs/tabs. The primary member and each secondary member may be provided with a plurality of wedge-shaped overhangs/tabs to hold a respective joint spring in place.

Further, the first and second joint springs may be press-fit into the respective interior portions of the primary member and the secondary members. In addition, the first and second joint springs may be placed/introduced into the respective interior portions of the primary member and the secondary members by sliding the springs along the length of a component to which it is being installed. For instance, the first joint spring is slid into the interior of the primary member along the length of the primary member and is slid into the interior of the corresponding secondary member along the length of the corresponding secondary member.

The wiper blade further includes a third joint spring fixed to the interior of the first secondary member and fixed to an interior of a first tertiary member. The third joint spring extends across the first tertiary member and the first secondary member to fix the first tertiary member to the first secondary member. A fourth joint spring is fixed to the interior of the second secondary member and fixed to an interior of a second tertiary member. The fourth joint spring extends across the second secondary member and second tertiary member and fixes the second secondary member to the second tertiary member. The third and fourth joint springs are provided to the interior of the respective secondary members and tertiary members and are kept in place by a plurality of wedge-shaped overhangs/tabs. The primary member and each secondary member and each tertiary member may be provided with a plurality of wedge-shaped overhangs/tabs to hold a respective joint spring in place.

The third and fourth joint springs may be press-fit into the respective interior portions of the secondary members and tertiary members. In addition, the third and fourth joint springs may be placed/introduced into the respective interior portions of the member and the tertiary members by sliding the springs along the length of the component to which it is being installed. For instance, the first joint spring is slid into the interior of the primary member along the length of the primary member and is slid into the interior of the corresponding tertiary member along the length of the corresponding tertiary member. The first, second, third and fourth joint springs strengthen the movable connection of the primary member to the secondary members, and the respective secondary members to the respective tertiary members in the lateral direction. Further, without the joint springs, the movable connections would not have enough joint strength.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will now be described with reference to the accompanying drawings, wherein the same reference numerals have been used to identify the same or similar elements throughout the several views.

Figure 1:
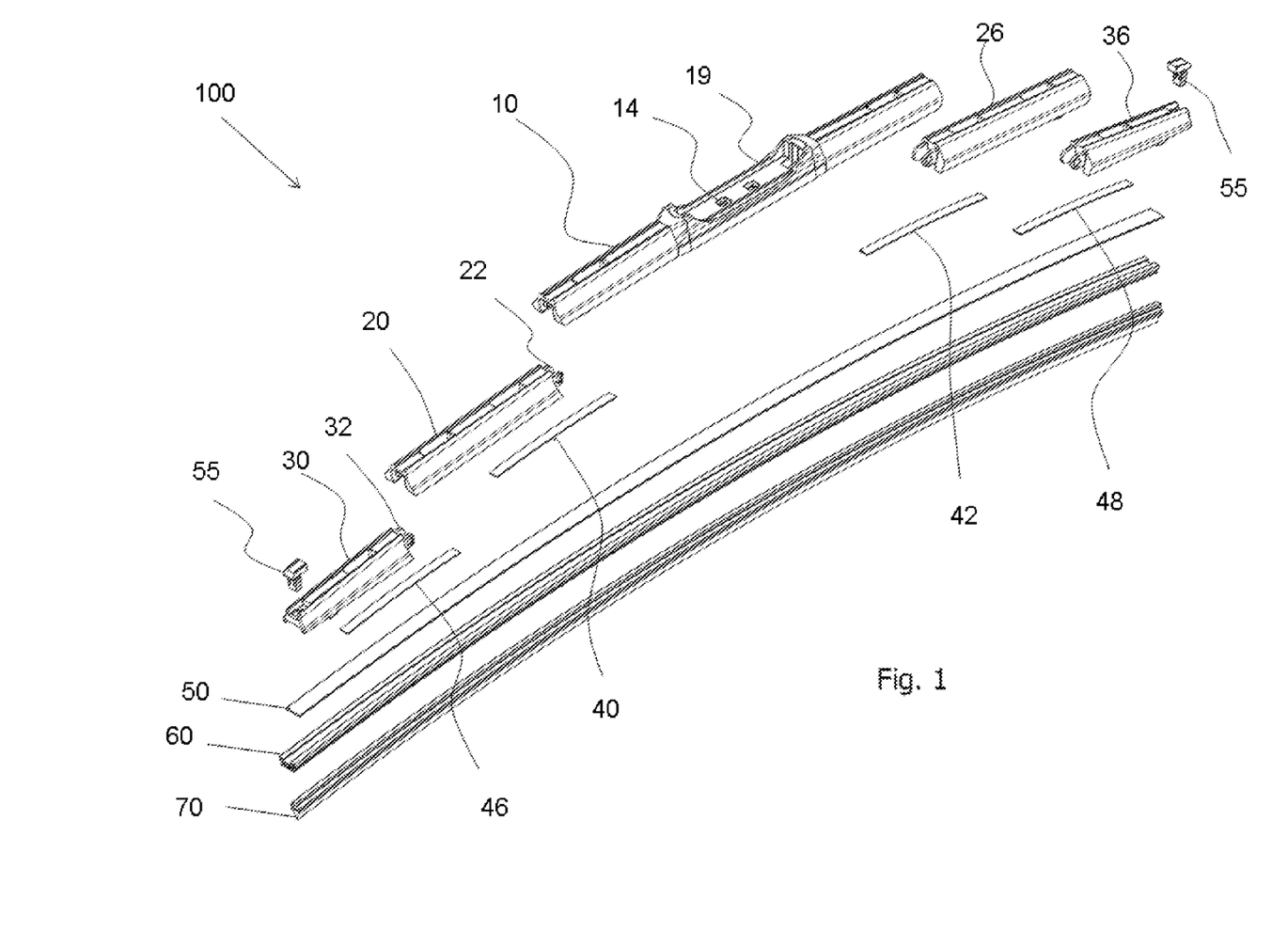
FIG. 1 illustrates a perspective view of the wiper blade according to a first embodiment of the present invention, including five frame components and four joint springs.
Figures 2, 3:
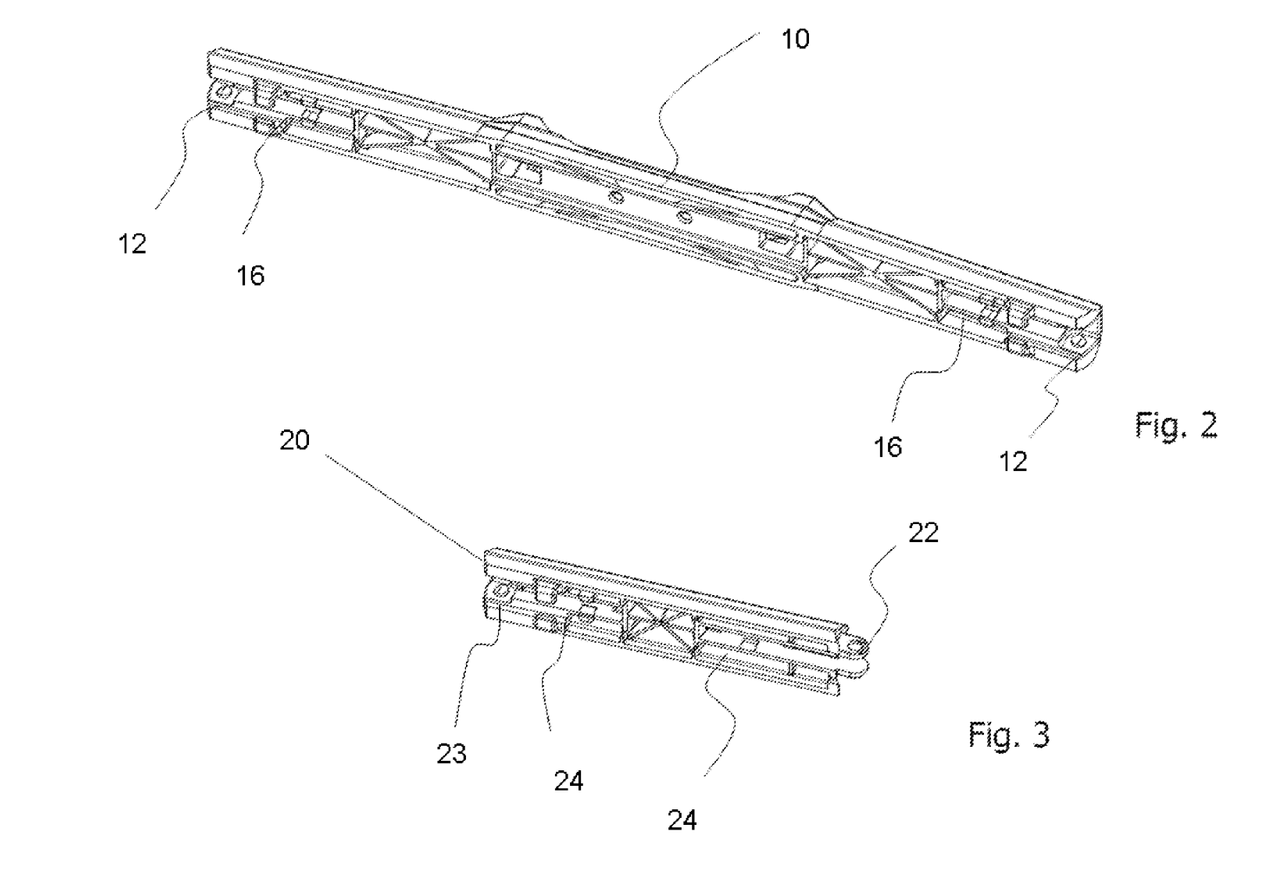
FIG. 2 illustrates a perspective view of the primary member according to the first embodiment of FIG. 1.
FIG. 3 illustrates a perspective view of the secondary member according to the first embodiment of FIG. 1.

According to a first embodiment of the invention, as illustrated in FIGS. 1-7, a wiper blade 100 includes a primary member 10 with an interior space 16 formed therein, as illustrated in FIG. 2, and two secondary members 20, 26. FIG. 1 illustrates an exploded view of the wiper blade 100 to clearly show each of the components. Each secondary member 20, 26 has a first end and a second end, the first end of a first secondary member 20 being connected to and received into the interior space 16 of the primary member 10 at a first end of the primary member 10, the first end of a second secondary member 26 being connected to and received into the interior space of the primary member 10 at a second end of the primary member 10 opposite to the first end of the primary member 10. The secondary members 20, 26 may be hingedly connected to the primary member 10 to pivot, swivel and/or rotate relative to a longitudinal axis of the primary member 10 to accommodate a changing curvature of a surface of a windshield 110 based on pressure applied by the wiper arm 1 against the windshield 110 (shown in FIG. 19).

The secondary members 20, 26 include arms 22 extending outward along a longitudinal axis, each arm 22 including a recess for engaging a respective protrusion 12 of primary member 10.

The wiper blade 100 may optionally include two tertiary members 30, 36, each tertiary member 30, 36 being connected to a secondary member 20, 26 at a first end thereof and may be hingedly connected to the respective secondary member 20, 26 to pivot, swivel and/or rotate relative to a longitudinal axis of the secondary member 20, 26 to accommodate a changing curvature of a surface of a windshield 110 based on pressure by the wiper blade 100 applied against the windshield 110. Further, each tertiary member 30, 36 includes respective interior portions 34, as illustrated in FIG. 7. FIG. 7 is a perspective view of the cross-section of the wiper blade 100 shown in FIG. 6 about plane VI-VI and includes a perspective view of a joint spring 40.

The wiper blade 100 further includes four joint springs 40, 42, 46, 48. A first joint spring 40 is fixed to the interior 16 of the primary member 10 and is fixed to an interior 24 of the first secondary member 20. The first joint spring 40 extends across the first secondary member 20 and extends across the primary member 10 and fixes the first secondary member 20 and the primary member 10 to one another.

A second joint spring 42 is fixed to the interior 16 of the primary member 10 and is fixed to an interior 24 of the second secondary member 26. The second joint spring 42 extends across the second secondary member 26 and across the primary member 10 and fixes the second secondary member 26 and the primary member 10 to one another.

Figure 6:
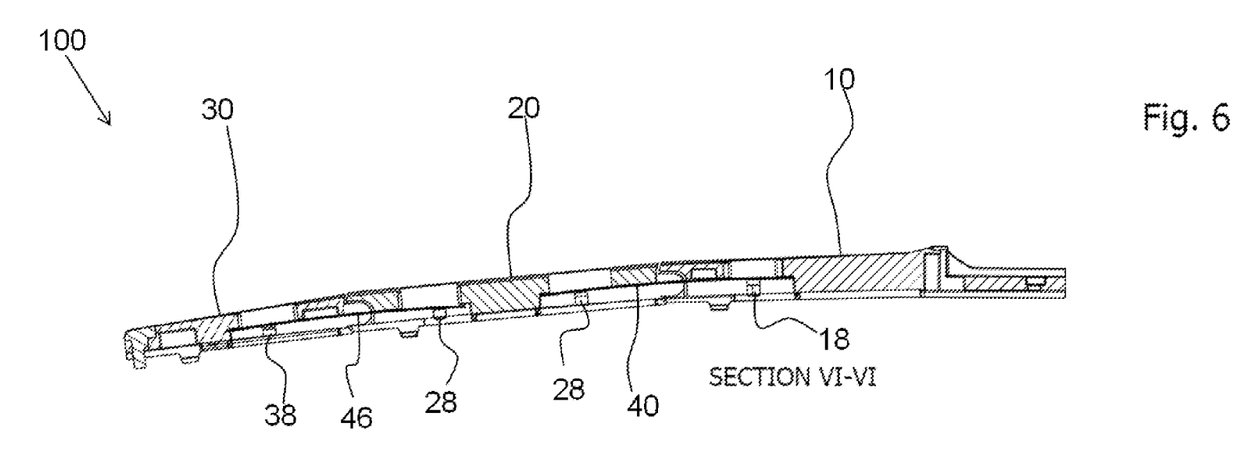
FIG. 6 illustrates side cross-sectional view of the wiper blade according to the first embodiment about plane VI-VI.
Figure 7:
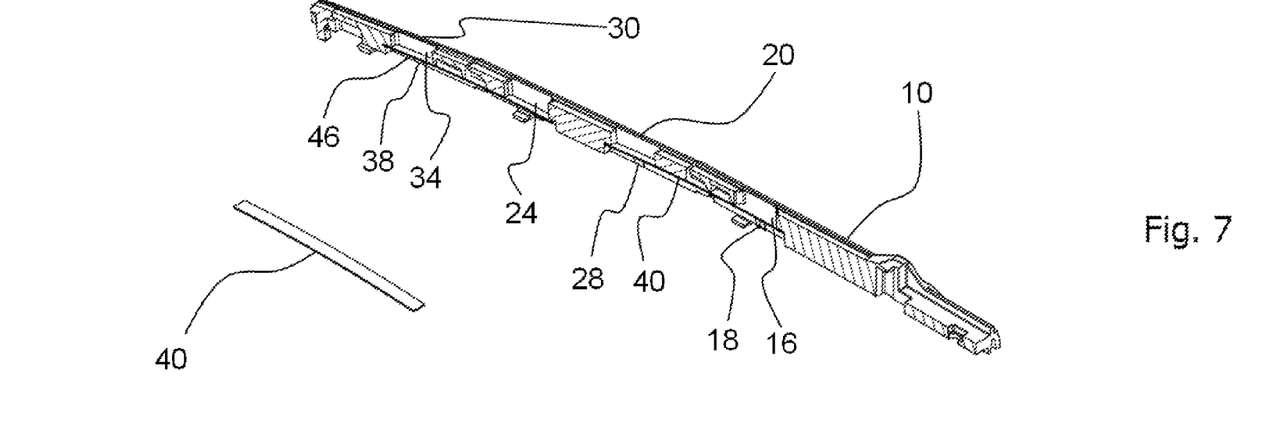
FIG. 7 illustrates a perspective view of the cross-section of the wiper blade shown in FIG. 6 about plane VI-VI and including a perspective view of a spring.

The first and second joint springs 40, 42 are provided to the interior 16 of the primary member 10 and the respective secondary members 20, 26 and are kept in place by a plurality of wedge-shaped overhangs/tabs 18, 28, including wedge-shaped overhangs/tabs 18 of the primary member 10 and wedge-shaped overhangs/tabs 28 of the secondary member 20, 26, as illustrated in FIGS. 6 and 7. FIG. 6 illustrates side cross-sectional view of the wiper blade 100 according to the first embodiment about plane VI-VI, including the wedge shaped overhangs/tabs 18, 28, 38 of the respective member.

The wedge-shaped overhangs/tabs 18, 28, 38 are illustrated with a hashed marking, and the primary member 10, each secondary member 20, 26, and each tertiary member 30, 36 may be provided with a plurality of wedge-shaped overhangs/tabs 18, 28, 38. The primary member 10, each secondary member 20, 26 and each tertiary member 30, 36 may include one or more wedge-shaped overhangs/tabs 18, 28, 38.

The first and second joint springs 40, 42 may be press-fit into the respective interior portions 16, 24 of the primary member 10 and the secondary members 20, 26. In addition, the first and second joint springs 40, 42 may be placed/introduced into the respective interior portions 16, 24 of the primary member 10 and the secondary members 20, 26 by sliding the springs 40, 42 along the length of the component to which it is being installed. For instance, the first joint spring 40 is slid into the interior 16 of the primary member 10 along the length of the primary member 10 and is slid into the interior 24 of the first secondary member 20 along the length of the first secondary member 20. Likewise, the second joint spring 42 is slid into the interior 16 of the primary member 10 along the length of the primary member 10 and is slid into the interior 24 of the second secondary member 26 along the length of the second secondary member 26.

The wiper blade 100 further includes a third joint spring 46 fixed to the interior 24 of the first secondary member 20 and fixed to an interior of a first tertiary member 30. The third joint spring 46 extends across the first tertiary member 30 and the first secondary member 20 to fix the first tertiary member 30 to the first secondary member 20.

The wiper blade 100 further includes a fourth joint spring 48 fixed to the interior 24 of the second secondary member 26 and fixed to an interior 34 of a second tertiary member 36. The fourth joint spring 48 extends across the second secondary member 26 and the second tertiary member 36 and fixes the second secondary member 26 to the second tertiary member 36.

The third and fourth joint springs 46, 48 are provided to the interior of the respective secondary members 20, 26 and tertiary members 30, 36 and are kept in place by a plurality of wedge-shaped overhangs/tabs 28, 38. Each tertiary member 30, 36 may be provided with a plurality of wedge-shaped overhangs/tabs 38. Further, the third and fourth joint springs 46, 48 may be press-fit into the respective interior portions 24, 34 of the respective secondary member 20, 26 and the respective tertiary member 30, 36. In addition, the third and fourth joint springs 46, 48 may be placed/introduced into the respective interior portions 24, 34 of the secondary member 20, 26 and the respective tertiary member 30, 36 by sliding the joint springs 46, 48 along the length of the component to which the joint spring 46, 48 is being installed. For instance, the third joint spring 46 is slid into the interior 24 of the first secondary member 20 along the length of the first secondary member 20 and the third joint spring 46 is slid into the interior 34 of the first tertiary member 30 along the length of the first tertiary member 30. Likewise, the fourth joint spring 48 is slid into the interior 24 of the second secondary member 26 along the length of the second secondary member 26 and the fourth joint spring 46 is slid into the interior 34 of the second tertiary member 36 along the length of the second tertiary member 36.

Each joint spring 40, 42, 46, 48 is pre-bent and provides a downward force at the outer tip of the wiper blade assembly of each joint. Each joint spring 40, 42, 46, 48 has a dual function, as it is positioned within the interior of the respective component to increase lateral stiffness of the blade construction, in addition to providing the downward force.

The wiper blade 100 according to the first embodiment may further include a plurality of claw elements 80 for receiving a wiping element support track 50, and the primary member 10, each secondary member 20, 26, and each tertiary member 30, 36 includes at least one claw 80 to receive a respective portion of the wiping element support track 50.

FIG. 2 illustrates a perspective view of the primary member 10 according to the first embodiment. The primary member 10 includes a pair of cylindrical protrusions 12 at each end thereof, as illustrated in FIG. 2, that connect to cylindrical recesses provided in a respective arm 22 of the first end of the respective secondary member 20, 26. The cylindrical protrusions 12 are provided at an interior surface 16 of the primary member 10. Further, the cylindrical protrusions 12 face each other and engage a respective cylindrical recess of a respective arm 22. The protrusions 12 could have an alternate shape, such as a hemispherical shape, that corresponds to the respective recess of the respective arm 22.

FIG. 3 illustrates a perspective view of the secondary member 20, 26 according to the first embodiment, and shows details of a lower surface of the secondary member 20, 26. The details of the lower surface include the interior surface 24 and the general structure thereof. Each cylindrical recess of the secondary member 20, 26 is provided in a respective arm 22 that extends in a lengthwise direction of the respective secondary member 20, 26, and each arm 22 extends toward the primary member 10. Specifically, each arm 22 extends towards a respective cylindrical protrusion 12 of the primary member 10.

The second end of each secondary member 20, 26 is provided with a pair of cylindrical protrusions 23 that connect to cylindrical recesses provided in an arm 32 of the first end of the respective tertiary member 30, 36. The cylindrical protrusions 23 of the secondary member are similar to the cylindrical protrusions 12 of the primary member 10. The protrusions 23 could have an alternate shape, such as a hemispherical shape, that corresponds to the respective recess of the respective arm 32.

Each tertiary member 30, 36 is provided with arms 32, each arm 32 having a cylindrical recess. Each arm 32 of the tertiary member 30, 36 extends in a lengthwise direction of the respective tertiary member 30, 36, and each arm 32 extends toward the cylindrical protrusions 23 of the secondary member 20, 26.

Each of the tertiary members 30, 36 and/or secondary members 20, 26 include two arms 22, 32 which may be rectangular in shape or have any other shape, having a spacing between them that is marginally larger than a width of the respective joint spring 40, 42, 46, 48. Each of the arms 22, 32 has outward facing surfaces provided with cylindrical recesses. The terminating end of the arm 22, 32 facing away from the respective component in the longitudinal direction thereof has a full radius and the opposing end has a radius that flows through the arms 22, 32 and forms one end of the outward visible joint.

Each respective arm 22, 32 of each secondary member 20, 26 and each tertiary member 30, 36 includes a recess that engages a respective protrusion 12, 23. This engagement may be a press-fit connection, and it allows each secondary member 20, 26 to be hingedly connected to the primary member 10, and allows each tertiary member 30, 36 to be hingedly connected to the respective secondary member 20, 26. Further, each protrusion 12, 23 of the primary member 10 and the second members 20, 26 may have a cylindrical shape that engages the respective cylindrical recess.

The wiper blade 100 further includes a wiping element/squeegee support track 50 having a first holder on an upper member and a second holder on a lower member, an elastic element 60 seated within the first holder of the wiping element support track 50, and a wiping element/squeegee 70 seated within the second holder of the wiping element/squeegee support track 50. Further, the wiping element/squeegee support track 50 may include a spline and vertebrae.

The tertiary members 30, 36 are each provided with an end stop 55 to prohibit movement of the wiping element/squeegee support track 50.

The primary member 10 may include at least two main claws 80, each secondary member 20, 26 may include at least one claw 80, and each tertiary member may include at least one claw 80, each claw 80 receiving a portion of the wiping element support track 50 therebetween.

The wiper blade 100 includes multi-blade frame components, including the primary member 10, two secondary members 20, 26 and optionally two tertiary members 30, 36, that allow the flexing and retention of a wiping element 70. The wiper blade 300 of the third embodiment is provided without tertiary members, however, the wiper blade 100, 200, 300 in each disclosed embodiment may be provided without tertiary members. In other words, the wiper blade 100, 200, 300 of the present invention may include a fewer or greater number of joint springs 40, 42, 46, 48 and may be provided without tertiary members, to include only a primary member 10 and two secondary members 20, 26.

Each member is interlocked, having a pivoting joint via joint springs 40, 42, 46, 48 and the pivoting connection between the respective protrusions 12, 23 and the cylindrical recesses of the components as described above. To provide a downward force at an outer tip of the blade assembly, each joint has a flat pre-bent joint spring 40, 42, 46, 48 placed internally. The joint spring 40, 42, 46, 48 has a dual function as the joint spring 40, 42, 46, 48 is positioned in such a way that the joint spring 40, 42, 46, 48 will add to the lateral stiffness of the blade construction in addition to providing the downforce. Claws 80 facing the windshield 110 are used to retain a vertebra that also retains the wiping element 70 and a spline, the spline may optionally include metal or any other material used for splines.

Each of the primary member 10, the secondary members 20, 26 and the tertiary members 30, 36 may include reinforced polymer. The vertebra may include a polymer material, or any other material known for use in vertebras.

When placing the wiper blade 100, 200, 300 on a curved windshield 110, the joint springs 40, 42, 46, 48 provide the force needed to shape the primary member 10, secondary members 20, 26 and tertiary members 30, 36 to the windshield 110. During operation, the curvature of the windshield 110 changes, and the pivoting joints allow for these shape changes and keep the wiping element 70 in contact with the windshield 110.

Figure 4:
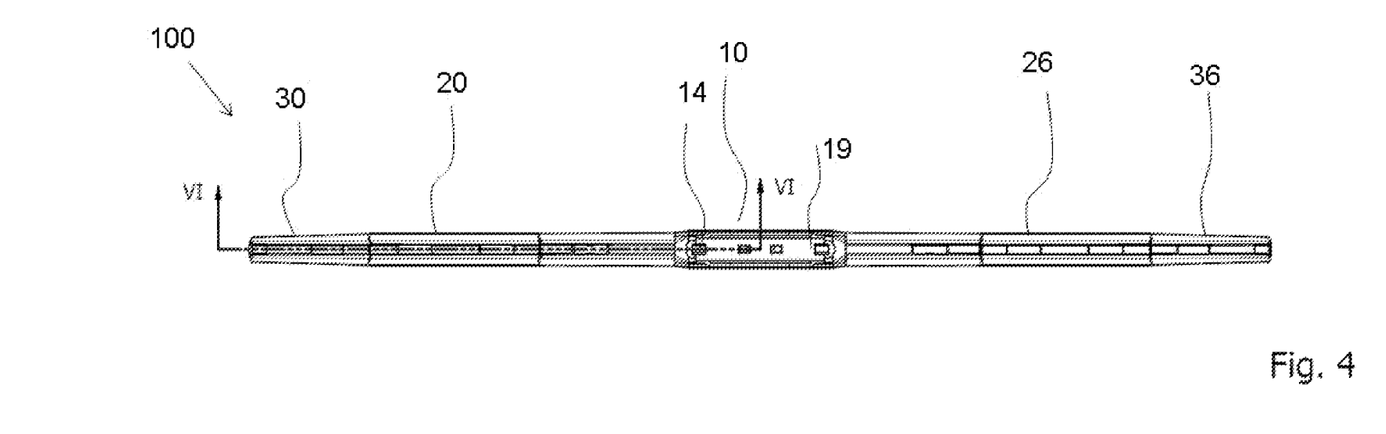
FIG. 4 illustrates a top view of the wiper blade according to the first embodiment.

FIG. 4 illustrates a top view of the wiper blade 100 according to the first embodiment that is shown in a connected state, and illustrates plane VI-VI. FIG. 7 illustrates a perspective view of the cross-section of the wiper blade 100 shown in FIG. 6 about plane XI-VI, shown in FIG. 4 and includes a perspective view of a joint spring 40, 42, 46, 48.

Figure 5:
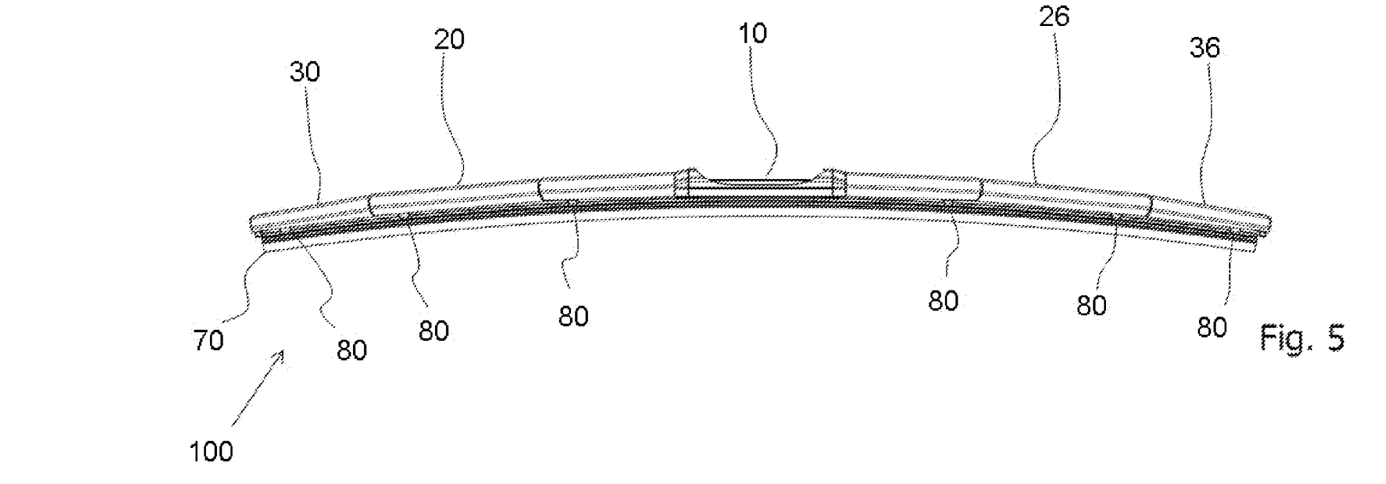
FIG. 5 illustrates a side view of the wiper blade according to the first embodiment.

FIG. 5 illustrates a side view of the wiper blade 100 in the connected state shown in FIG. 4 according to the first embodiment.

The joint between the secondary member 20, 26 and primary member 10, and the joint between the secondary member 20, 26 and the tertiary member 30, 36 has an opening with two cylindrical protrusions 12, 23 facing toward the center of the part to form a mating component with the cylindrical recesses of the arm 22, 32 of the respective member.

By pushing each of the parts laterally together, the cylindrical protrusions 12, 23 snap into the respective cylindrical recesses forming a rotating joint between the two components, including between the primary member 10 and the secondary members 20, 26, and between each secondary member 20, 26 and the respective tertiary member 30, 36.

Each part has at its side, facing the windshield 110, a pocket at an internal surface thereof to receive the joint spring 40, 42, 46, 48, as shown in FIGS. 2, 3, 7, 12, 13, 16 and 17. To retain the joint spring 40, 42, 46, 48, a wedge shaped inwardly facing overhang/tab 18, 28, 38 is added to each opposing sidewall of the pocket where the widest distance forms a lead-in to assist the joint spring 40, 42, 46, 48. The sidewalls are constructed to allow deflection during assembly of the joint spring 40, 42, 46, 48.

The secondary members 20, 26 or the tertiary members 30, 36 are provided with a hole at an outboard end thereof to accommodate an end stop 55 for limiting the travel of the wiping element/squeegee support track 50. The end stop 55 is provided with a head and a body. The head extends horizontally and the body extends vertically so that the head and the body are generally perpendicularly arranged with respect to each other, although other angles are within the scope of this disclosure.

As illustrated in FIGS. 8-13, in accordance with a second embodiment of the present invention, the wiper blade 200 includes two joint springs 40, 42, each joint spring 40, 42 extending across the primary member 10, a secondary member 20, 26, and a tertiary member 30, 36 to allow for the wiper blade 200 to flexibly contact the windshield 110. The joint springs 40, 42 of the second embodiment work in the manner described with respect to the first embodiment.

Figures 8, 9:
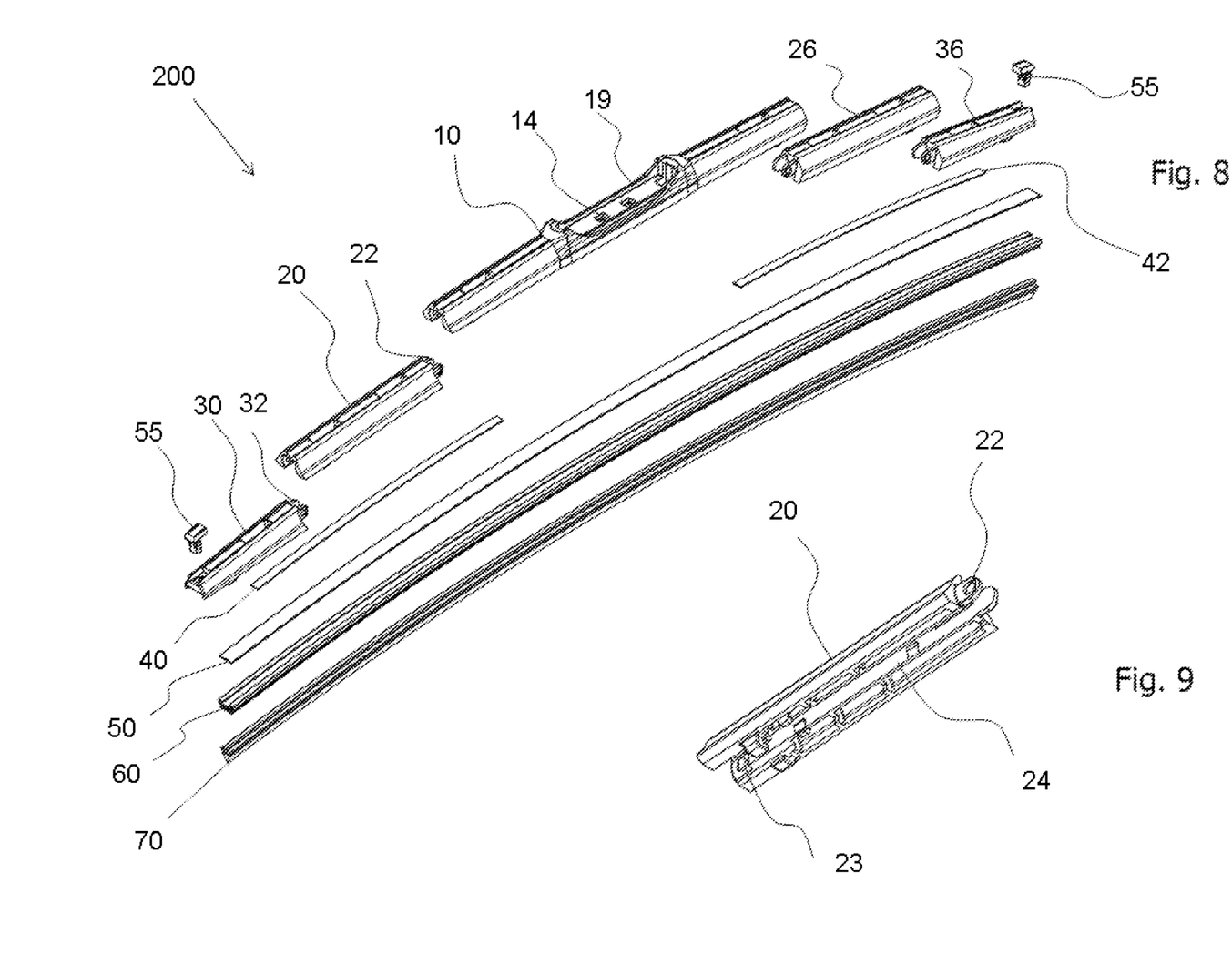
FIG. 8 illustrates an perspective view of the wiper blade according to a second embodiment of the present invention, including five frame components and two joint springs.
FIG. 9 illustrates a perspective view of the secondary member of the wiper blade of FIG. 8, according to the second embodiment of the present invention, that is shaped to receive a joint throughout its length.
Figure 10:
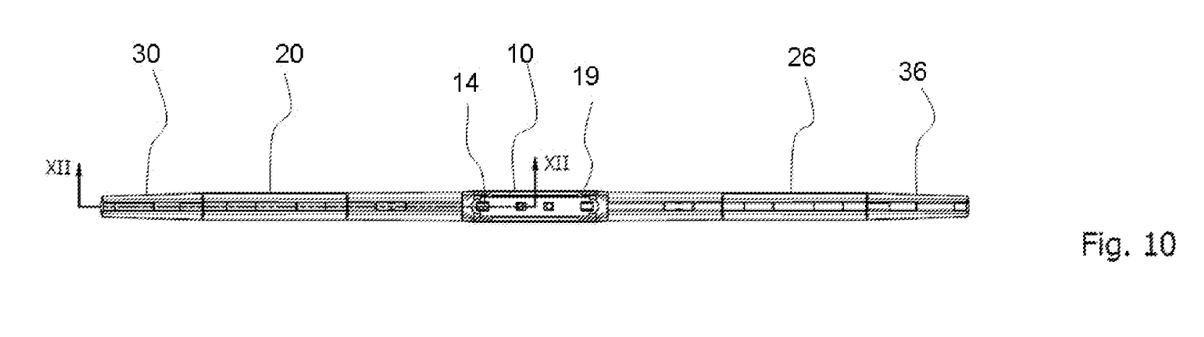
FIG. 10 illustrates a top view of the wiper blade according to a second embodiment of the present invention.
Figure 11:
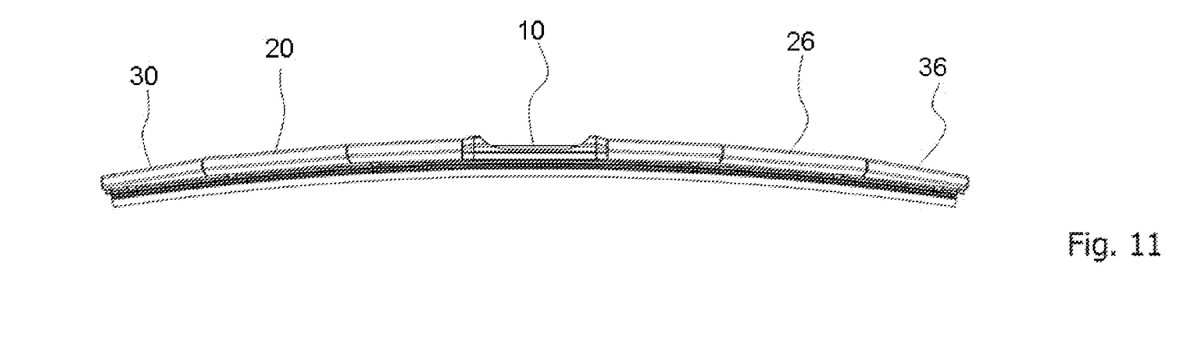
FIG. 11 illustrates a side view of the wiper blade according to second embodiment of the present invention.
Figure 12:
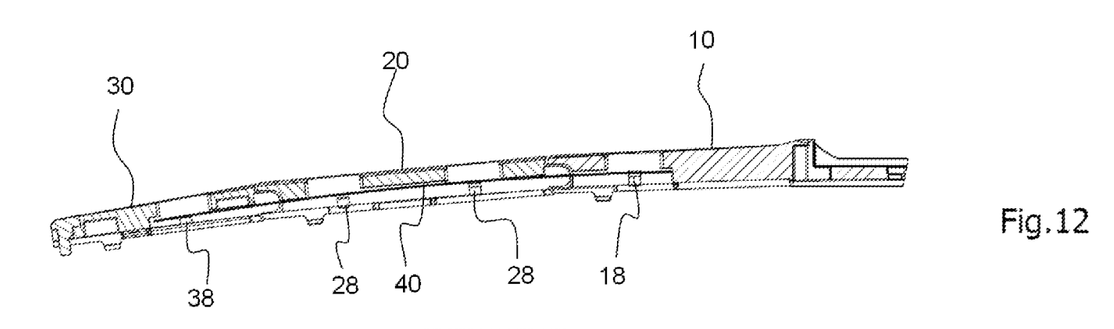
FIG. 12 illustrates a side cross-sectional view of the wiper blade according to the second embodiment about plane XII-XII.
Figure 13:
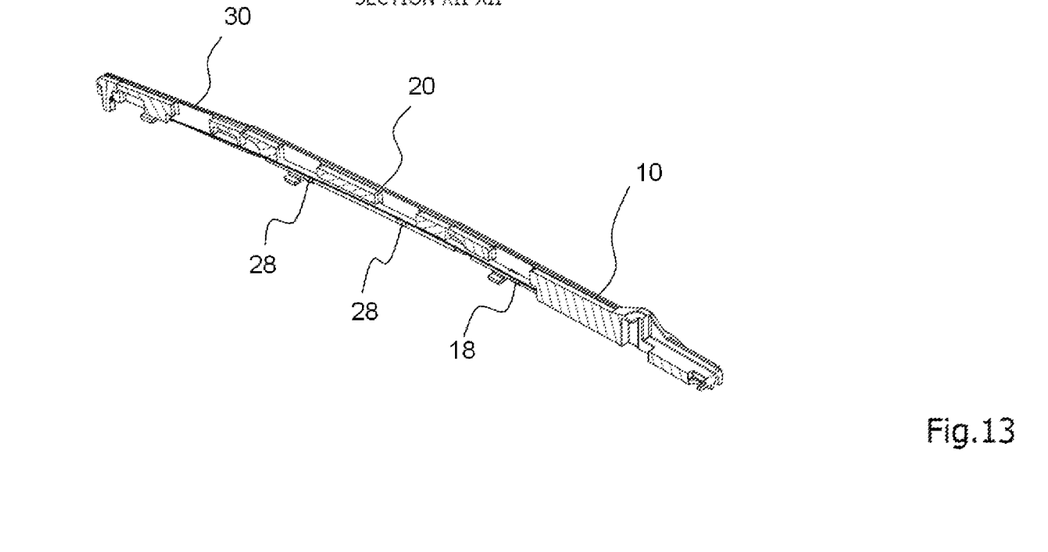
FIG. 13 illustrates a perspective view of the cross-section of the wiper blade shown in FIG. 12 about plane XII-XII.

FIG. 8 is a perspective view of the wiper blade 200 according to a second embodiment of the present invention, and FIG. 9 is a perspective view of the secondary member 20, 26 of the wiper blade 200 of FIG. 8, according to the second embodiment of the present invention, that is shaped to receive a joint throughout its length. In FIG. 8, the components of the wiper blade 200 are exploded to show the structure of the various components, including the primary member 10, the secondary members 20, 26, the tertiary members 30, 36, the two springs 40, 42, the wiping element support track 50, the elastic element 60, and the wiping element/squeegee 70.

Each of the two springs 40, 42 of the second embodiment extend from an interior surface 34 of the respective tertiary member 30, 36, through an interior surface 24 of the respective secondary member 20, 26, and to an interior surface 16 of the primary member 10. As stated above with respect to the first embodiment, the springs 40, 42 may have a press-fit connection with the respective interior portions 16, 24, 34. Therefore, the interior surfaces 16, 24, 34 of primary member 10, each secondary member 20, 26, and each tertiary member 30, 36 receives and is fixed to the respective spring member 40, 42.

The secondary member 20, 26 according to the second embodiment may be provided with an inner surface 24 that is substantially continuous through the length of the secondary member 20, 26. A respective joint spring 40, 42 extends from the primary member 10, through an entirety of the inner surface of the secondary member 20, 26, and to the tertiary member 30, 36. Alternatively, the wiper blade 200 may be provided without tertiary members 30, 36 and each joint spring 40, 42 may extend only up to a portion of the secondary members 20, 26 such as in the manner illustrated in FIG. 14.

The second embodiment of the present invention utilizes only two joint springs 40, 42, one in each half of the blade assembly. This reduces the part count and improves assembly time. Each wiper blade 200 assembly may have a dedicated set of joint springs 40, 42 to accommodate for different length requirements.

Figure 14:
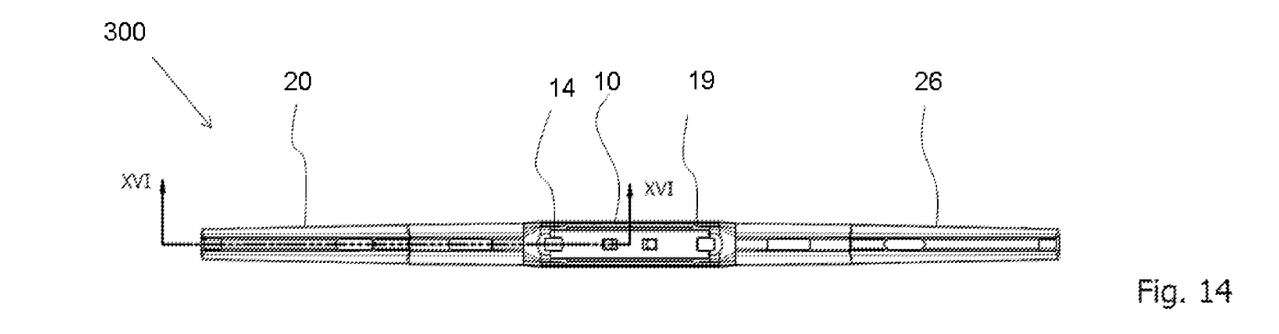
FIG. 14 illustrates a top view of the wiper blade according to a third embodiment of the present invention, including three frame components and two joint springs.
Figure 15:
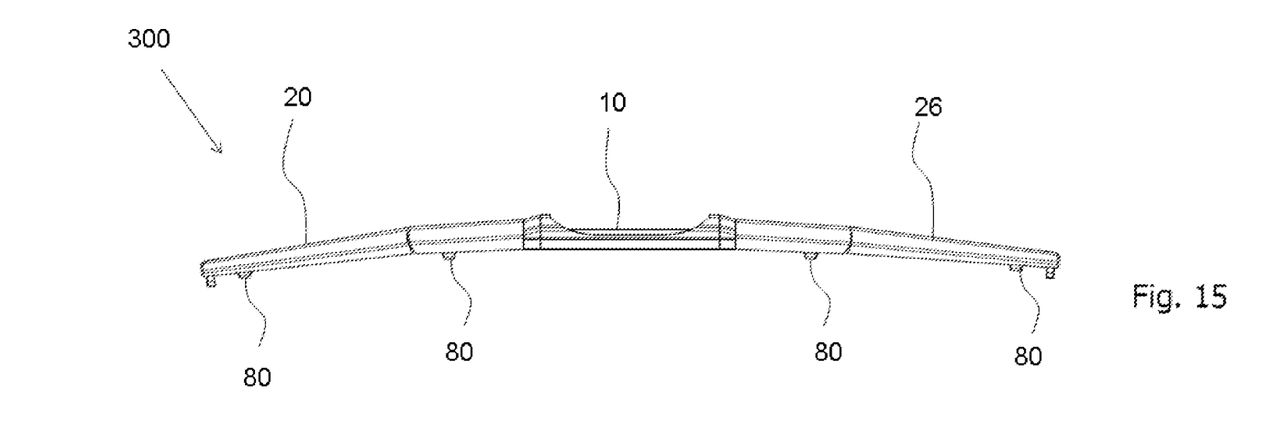
FIG. 15 illustrates a side view of the wiper blade according to the third embodiment of the present invention.

According to a third embodiment of the present invention, as illustrated in FIGS. 14-17, the wiper blade 300 includes three frame components and two joint springs 40, 42, with one joint spring 40, 42 in each half of the assembly. This is most advantageous for blades of smaller sizes, including blades less than 20 inches in length. The three frame components include one primary member 10 and two secondary members 20, 26. As provided above, the joint springs 40, 42 may have a press-fit connection with the respective frame component, and provide an elastic force to the wiper blade 300 to allow the wiper blade 300 to follow the curvature of the windshield 110. FIG. 14 is a top view of the wiper blade 300 according to a third embodiment of the present invention, and FIG. 15 is a side view that illustrates one primary member 10, two secondary members 20, 26, and four claws 80. However, a fewer or greater number of claws 80 may be provided.

Figure 16:
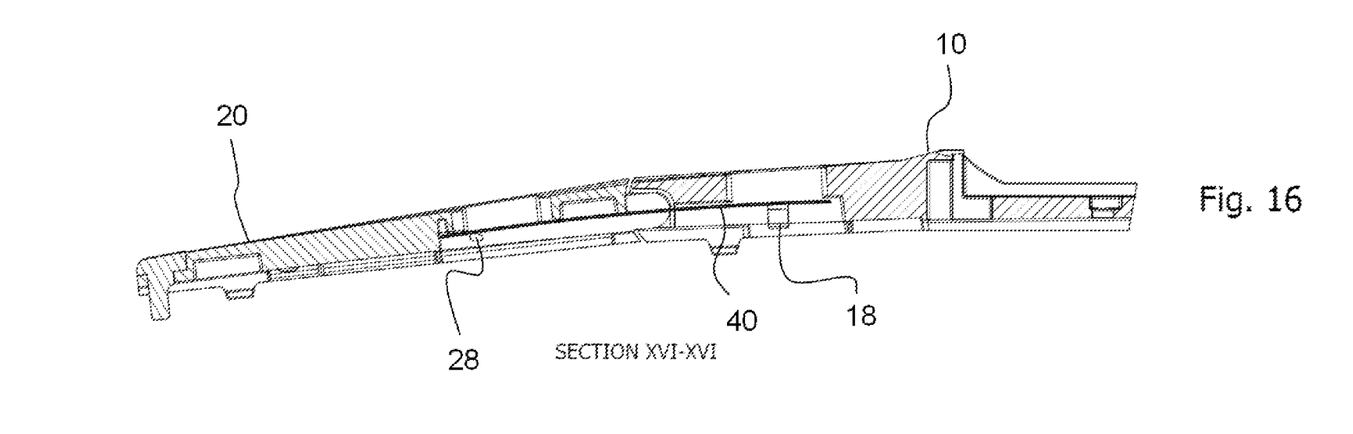
FIG. 16 illustrates a side cross-sectional view of the wiper blade according to the third embodiment about plane XVI-XVI.
Figure 17:
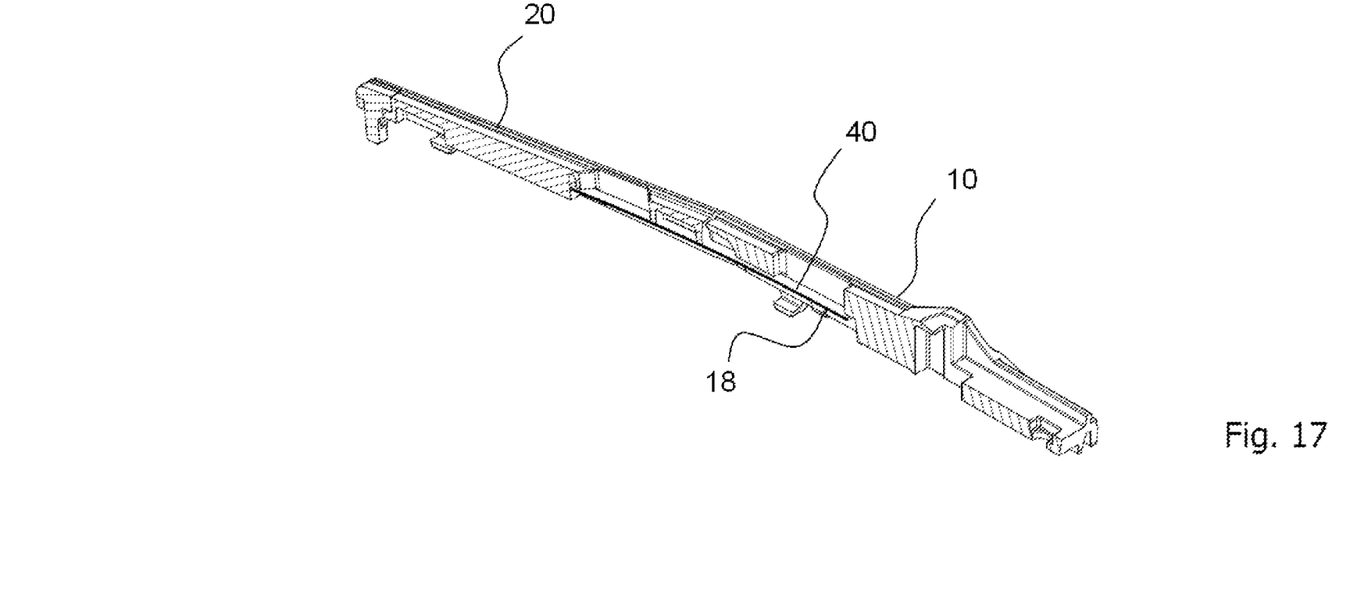
FIG. 17 illustrates a perspective of the cross-sectional view of the wiper blade according to the third embodiment about plane XVI-XVI.

FIG. 16 is a side cross-sectional view of the wiper blade 300 according to the third embodiment about plane XVI-XVI of the wiper blade 300 illustrated in FIG. 14. FIGS. 16 and 17 illustrate the wedge members 18, 28 of the primary member 10 and the secondary members 20, 26 holding the respective joint spring 40, 42 in place.

Figure 18:
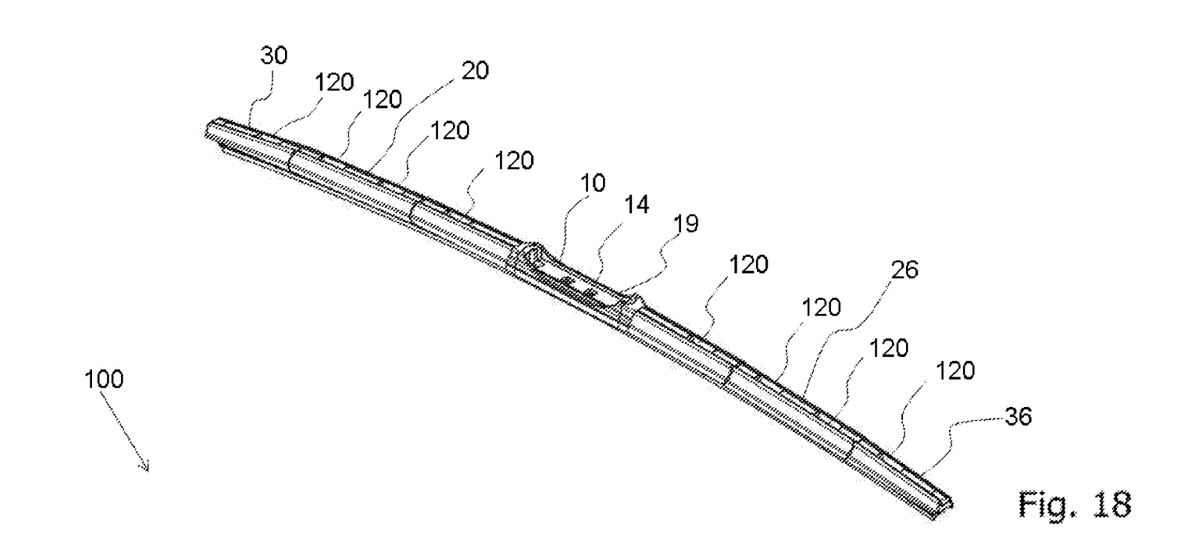
FIG. 18 illustrates a wiper blade according to an embodiment of the present invention including air holes along the top surface thereof.
Figure 19:
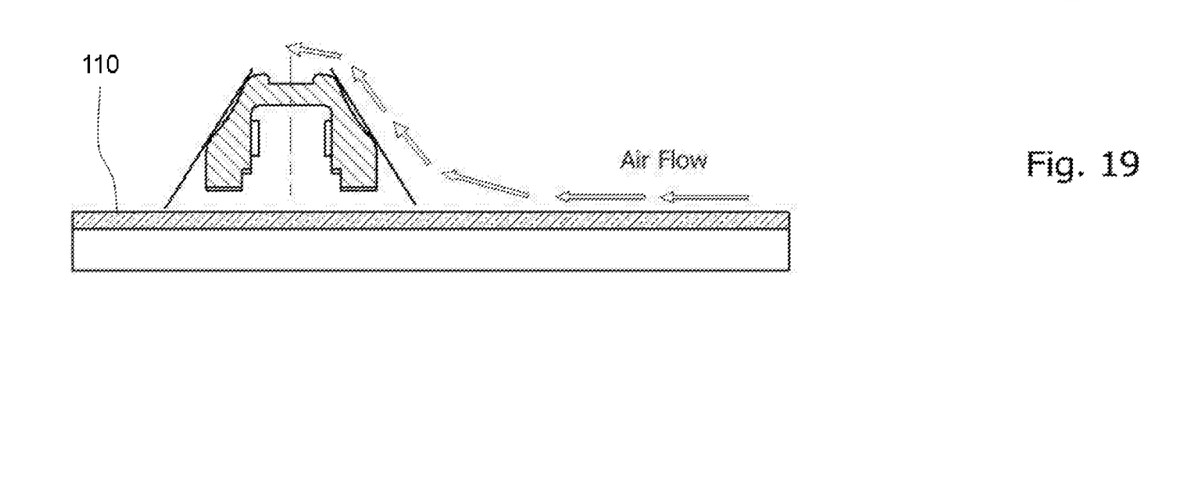
FIG. 19 illustrates a profile cross-sectional view of the wiper blade according to FIG. 18 installed on a windshield.

FIGS. 18 and 19 illustrate a top surface of the primary member 10, the secondary members 20, 26, and the tertiary members 30, 36 being provided with holes 120 to provide a means of air flow through the respective components. The shape and size of the holes 120 can vary to improve functionality, manufacturability, and aesthetics.

Each of the primary member 10, the secondary members 20, 26 and the tertiary members 30, 36 has a cross-sectional profile that forms a deflector for the air flowing, which is illustrated by the arrows in FIG. 19 extending towards and over the wiper blade 100, over the windshield 110 where at one position during a wipe cycle, the wiper blade 100, according to the present invention will be substantially perpendicular to this air flow. Further, the cross-sectional profile of the primary member 10, the secondary members 20, 26, and the tertiary members 30, 36 is symmetrical about their respective longitudinal axes for providing the same air deflecting properties in both directions of the wipe cycle.

The primary member 10 has the provision 19 in the center area to selectively install one of two types of adapter holders providing the means of installing a plurality of the most commonly used wiper arms, as illustrated in FIGS. 1, 2, 4, 8, 10, 14 and 18. The adapter holder is for connection to a windshield wiper arm. The attachment adapter holder is detachably mounted to a top surface the primary member via at least one connection tab and a protrusion member. The primary member 10 includes holes/openings 14 to accommodate installation of the attachment member, as known in the art and as described in U.S. Pat. No. 9,145,111, dated Sep. 29, 2015 and U.S. Pat. No. 8,037,568 B2, dated Oct. 18, 2011, the entire contents of which are herein incorporated by reference.

As illustrated in FIGS. 1, 2, 4, 8, 10, 14 and 18, the center area provision 19 is provided with four openings 14, each opening 14 receiving a protruding portion of the adapter holder for fixing the adapter holder thereto, as known in the art and as described in U.S. Pat. Nos. 9,145,111, and 8,037,568 B2, the entire contents of which are herein incorporated by reference.

Figure 20:
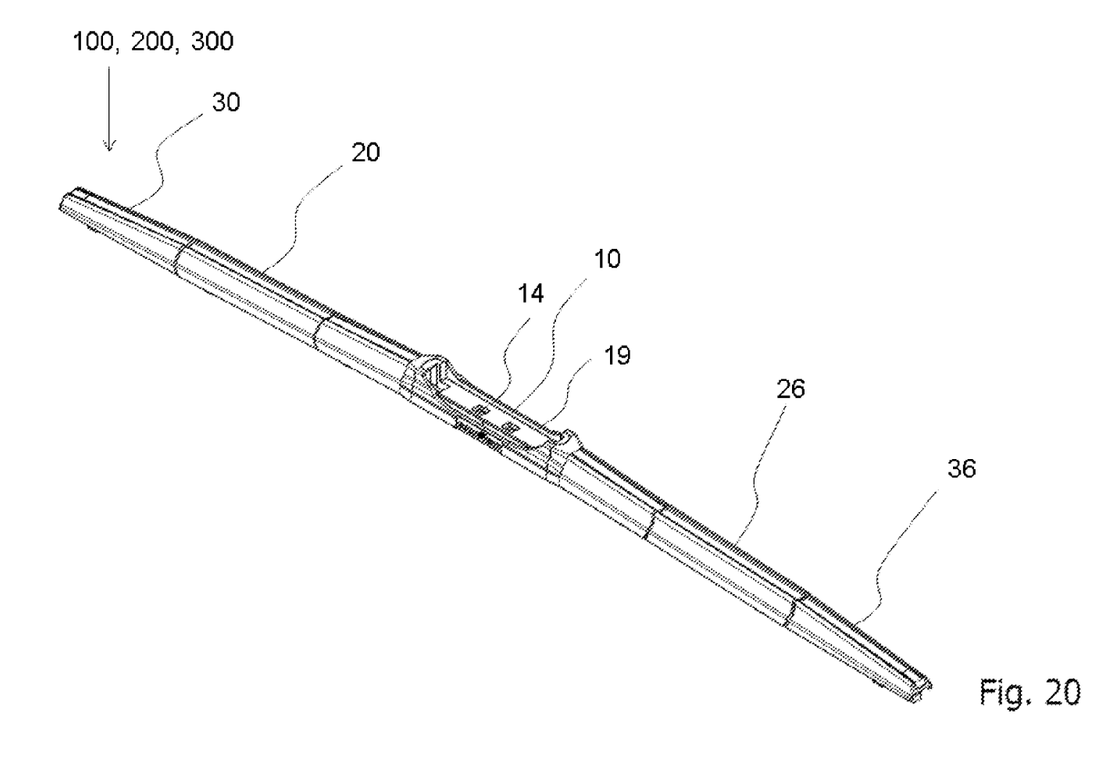
FIG. 20 illustrates a wiper blade having no holes on a top portion thereof.

FIG. 20 illustrates the top surface of the primary member 10, each secondary member 20, 26 and each tertiary member 30, 36 provided without holes to enhance the aesthetics of the wiper blade 100, 200, 300.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wiper blade, comprising:
   a primary member having an interior surface formed therein;
   at least one secondary member, each secondary member being connected to a respective end of the primary member; and
   at least one joint spring, each joint spring having a substantially uniform and planar shape across an entirety of a length of the joint spring,
   wherein the interior surface of the primary member is provided with two separate cylindrical protrusions,
   wherein each secondary member includes two arms, each arm of each secondary member having a cylindrical recess, and
   wherein the cylindrical recess of each of the two arms of each secondary member engages a respective one of the cylindrical protrusions of the primary member.

2. The wiper blade of claim 1, wherein the at least one secondary member includes two secondary members, a first secondary member being connected to a first end of the primary member and a second secondary member being connected to a second end of the primary member.

3. The wiper blade of claim 2, wherein the first and second secondary members are hingedly connected to the primary member to move relative to the primary member to accommodate a changing curvature of a surface of a windshield.

4. The wiper blade of claim 2, wherein the at least one joint spring includes a first joint spring extending from the primary member to the first secondary member and a second joint spring extending from the primary member to the second secondary member.

5. The wiper blade of claim 2, further comprising first and second tertiary members, each tertiary member being hingedly connected to a respective one of the first and second secondary members.

6. The wiper blade of claim 5, wherein an interior surface of each secondary member is provided with at least one protrusion,
   wherein each tertiary member includes at least one arm, each arm of each tertiary member having a recess, and
   wherein the recess of each arm of each tertiary member engages a respective protrusion of the respective secondary member.

7. The wiper blade of claim 6, wherein the at least one joint spring includes four joint springs, wherein a first joint spring extends from the primary member to the first secondary member and a second joint spring extends from the primary member to the second secondary member, a third joint spring extends from the first secondary member to the first tertiary member, and a fourth joint spring extends from the second secondary member to the second tertiary member.

8. The wiper blade of claim 7, wherein the primary member, each secondary member and each tertiary member are provided with respective wedge members,
   wherein the first and second joint springs are kept in place by the respective wedge members of the respective primary member and the respective secondary member,
   wherein the third and fourth joint springs are kept in place by the respective wedge members of the respective secondary member and the respective tertiary member, and wherein each wedge member includes a top surface that engages a bottom surface of a respective one of the first, second, third and fourth joint springs.

9. The wiper blade of claim 1, further comprising at least one claw member provided on a lower surface of the primary member and at least one claw member provided on a lower surface of each secondary member,
   wherein each claw member receives a wiping element support track, and
   wherein a wiping element is attached to the wiping element support track.

10. A wiper blade, comprising:
    a primary member having an interior surface formed therein;
    at least one secondary member, each secondary member being connected to a respective end of the primary member; and
    at least one joint spring, each joint spring having a substantially uniform and planar shape across an entirety of a length of the joint spring,
    wherein the interior surface of the primary member is provided with at least one protrusion,
    wherein each secondary member includes at least one arm, each arm of each secondary member having a recess,
    wherein the recess of each arm of each secondary member engages a respective protrusion of the primary member,
    wherein the at least one secondary member includes two secondary members, a first secondary member being connected to a first end of the primary member and a second secondary member being connected to a second end of the primary member,
    wherein the at least one joint spring includes a first joint spring extending from the primary member to the first secondary member and a second joint spring extending from the primary member to the second secondary member,
    wherein the primary member and each secondary member are provided with respective wedge members,
    wherein the first joint spring is kept in place by the respective wedge members of the primary member and the first secondary member,
    wherein the second joint spring is kept in in place by the respective wedge members of the primary member and the second secondary member, and
    wherein each wedge member includes a top surface that engages a bottom surface of a respective one of the first and second joint springs.

11. A wiper blade, comprising:
    a primary member having a first end, a second end, and an interior surface formed therein;
    first and second secondary members, each secondary member being connected to a respective one of the first end and the second end of the primary member; and
    at least two joint springs, including first and second joint springs, each joint spring having a substantially uniform and planar shape across an entirety of a length of the joint spring,
    wherein an interior surface of each of the first end and the second end of the primary member is provided with two separate cylindrical protrusions,
    wherein each of the first and second secondary members includes two arms, each arm of each secondary member having a cylindrical recess, and
    wherein the cylindrical recess of each arm of each secondary member engages a respective one of the cylindrical protrusions of the primary member to hingedly connect the respective secondary member to the primary member.

12. The wiper blade of claim 11, wherein the first and second secondary members are hingedly connected to the primary member to move relative to the primary member to accommodate a changing curvature of a surface of a windshield.

13. The wiper blade of claim 12, further comprising first and second tertiary members, each tertiary member being hingedly connected to a respective one of the first and second secondary members.

14. The wiper blade of claim 13, wherein the at least two joint springs further comprise third and fourth joint springs, and
    wherein the first joint spring extends from the primary member to the first secondary member, the second joint spring extends from the primary member to the second secondary member, the third joint spring extends from the first secondary member to the first tertiary member, and the fourth joint spring extends from the second secondary member to the second tertiary member.

15. The wiper blade of claim 14, wherein the primary member, each secondary member, and each tertiary member are provided with respective wedge members,
    wherein the first and second joint springs are kept in place by the respective wedge members of the primary member and the respective secondary member,
    wherein the third and fourth joint springs are kept in place by the respective wedge members of the respective secondary member and the respective tertiary member, and
    wherein each wedge member includes a top surface that engages a bottom surface of a respective one of the first, second, third and fourth joint springs.

16. The wiper blade of claim 15, wherein each joint spring is configured to force a respective two of the primary member, the secondary members and the tertiary members against a windshield to accommodate a changing curvature of a surface of the windshield.

17. The wiper blade of claim 11, wherein each protrusion of the primary member is circular in cross-sectional shape.

18. The wiper blade of claim 11, further comprising at least one claw member provided on a lower surface of the primary member and at least one claw member provided on a lower surface of each secondary member,
    wherein each claw member receives a wiping element support track, and
    wherein a wiping element is attached to the wiping element support track.

19. A wiper blade, comprising:
    a primary member having a first end, a second end, and an interior surface formed therein;
    first and second secondary members, each secondary member being connected to a respective one of the first end and the second end of the primary member; and
    at least two joint springs, including first and second joint springs, each joint spring having a substantially uniform and planar shape across an entirety of a length of the joint spring,
    wherein each of the first end and the second end of the primary member is provided with two protrusions,
    wherein each of the first and second secondary members includes two arms, each arm of each secondary member having a recess, wherein the recess of each arm of each secondary member engages a respective protrusion of the primary member to hingedly connect the respective secondary member to the primary member, wherein the primary member and each secondary member are provided with respective wedge members, wherein the first and second joint springs are kept in place by the respective wedge members of the primary member and the respective secondary member, and wherein each wedge member includes a top surface that engages a bottom surface of a respective one of the first and second joint springs.

20. A wiper blade, comprising:

a primary member having a first end, a second end, and an interior surface formed therein;

first and second secondary members, each secondary member being connected to a respective one of the first end and the second end of the primary member; and at least two joint springs, including a first joint spring extending between the primary member and the first secondary member and a second joint spring extending between the primary member and the second secondary member, wherein each joint spring has a substantially uniform and planar shape across an entirety of a length of the joint spring, wherein each of the first end and the second end of the primary member is provided with two protrusions, wherein each secondary member includes two arms, each arm of each secondary member having a recess, wherein the recess of each arm of each secondary member engages a respective protrusion of the primary member, wherein the primary member and each secondary member are provided with respective wedge members, wherein the first and second joint springs are kept in place by respective wedge members of the primary member and the respective secondary member, and wherein each wedge member includes a top surface that engages a bottom surface of a respective one of the first and second joint springs.

\* \* \* \* \*